(12) United States Patent
Kneipp

(10) Patent No.: US 6,470,586 B2
(45) Date of Patent: Oct. 29, 2002

(54) PIPE FITTERS LAY OUT TOOL

(76) Inventor: Matt C Kneipp, 273 W. Bartlett, Lynden, WA (US) 98264

( * ) Notice: Subject to any disclaimer, the term of this patent is extended or adjusted under 35 U.S.C. 154(b) by 10 days.

(21) Appl. No.: 09/823,347

(22) Filed: Apr. 2, 2001

(65) Prior Publication Data

US 2002/0139000 A1 Oct. 3, 2002

(51) Int. Cl.[7] .................................................. G01B 5/24
(52) U.S. Cl. ............................. 33/529; 33/451; 33/485
(58) Field of Search ........................... 33/1 R, 21.3, 384, 33/389, 412, 424, 451, 482, 483, 484, 485, 529

(56) References Cited

U.S. PATENT DOCUMENTS

| | | | | | |
|---|---|---|---|---|---|
| 1,406,262 | A | * | 2/1922 | Kronert | 33/451 |
| 1,692,925 | A | * | 11/1928 | Brown | 33/21.3 |
| 2,334,422 | A | * | 11/1943 | Lehnus | 33/21.3 |
| 2,614,329 | A | * | 10/1952 | Almorth | 33/484 |
| 2,777,210 | A | * | 1/1957 | Johnson et al. | 33/384 |
| 2,893,131 | A | * | 7/1959 | De Peu | 33/529 |
| 3,521,364 | A | * | 7/1970 | Metcalfe | 33/451 |
| 4,653,194 | A | * | 3/1987 | Kim | 33/451 |
| 4,736,524 | A | * | 4/1988 | King | 33/451 |
| 5,535,523 | A | * | 7/1996 | Endris | 33/451 |
| 5,651,184 | A | * | 7/1997 | Tutty | 33/529 |
| 6,012,229 | A | * | 1/2000 | Shiao | 33/451 |
| 6,134,795 | A | * | 10/2000 | Hitchcock | 33/451 |
| 6,317,993 | B1 | * | 11/2001 | Loyd | 33/412 |

* cited by examiner

Primary Examiner—G. Bradley Bennett

(57) ABSTRACT

A simplified light weight squaring tool used by pipe fitters in conjunction with templates or pipe fitters tables for laying out pipe intersect angles and geometry as required for cutting and joining pipe of various sizes at various angles. A rugged tool intended primarily for on sight use, comprises a self centering straight edge arranged for guiding and scribing of lines on flat surfaces, curved surfaces or across the diameter of a pipe face, an integral adjustable protractor level, allowing for fast and accurate perpendicular and angular orientation of the straight edge when used in the vertical plane and a self aligning extension arranged for expanding the capacity of the squaring tool and transcribing angular lines from the ace of pipe sections onto the circumference or outside diameter of pipe parallel to longitudinal centerline of the pipe as required for layout.

3 Claims, 7 Drawing Sheets

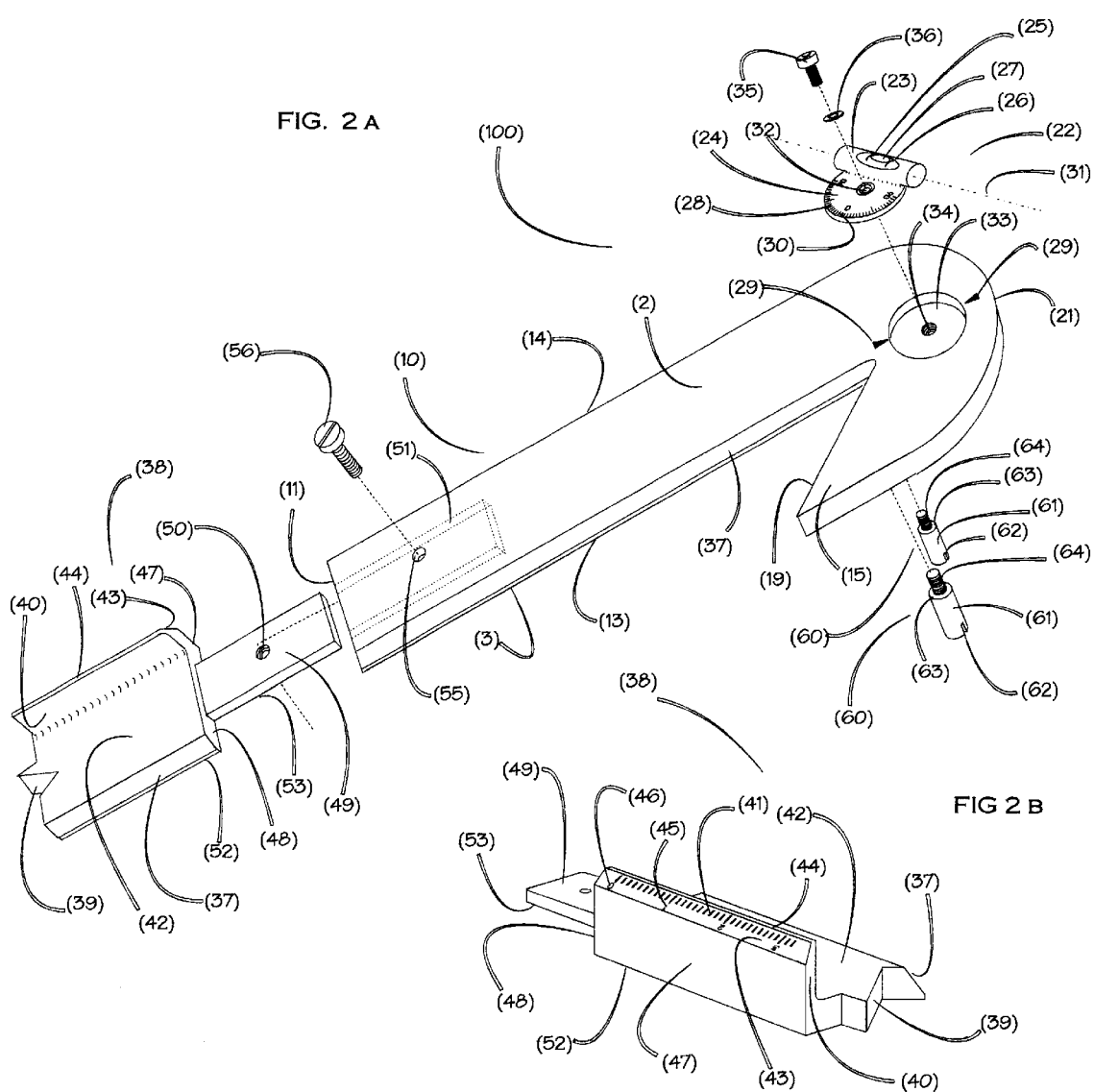

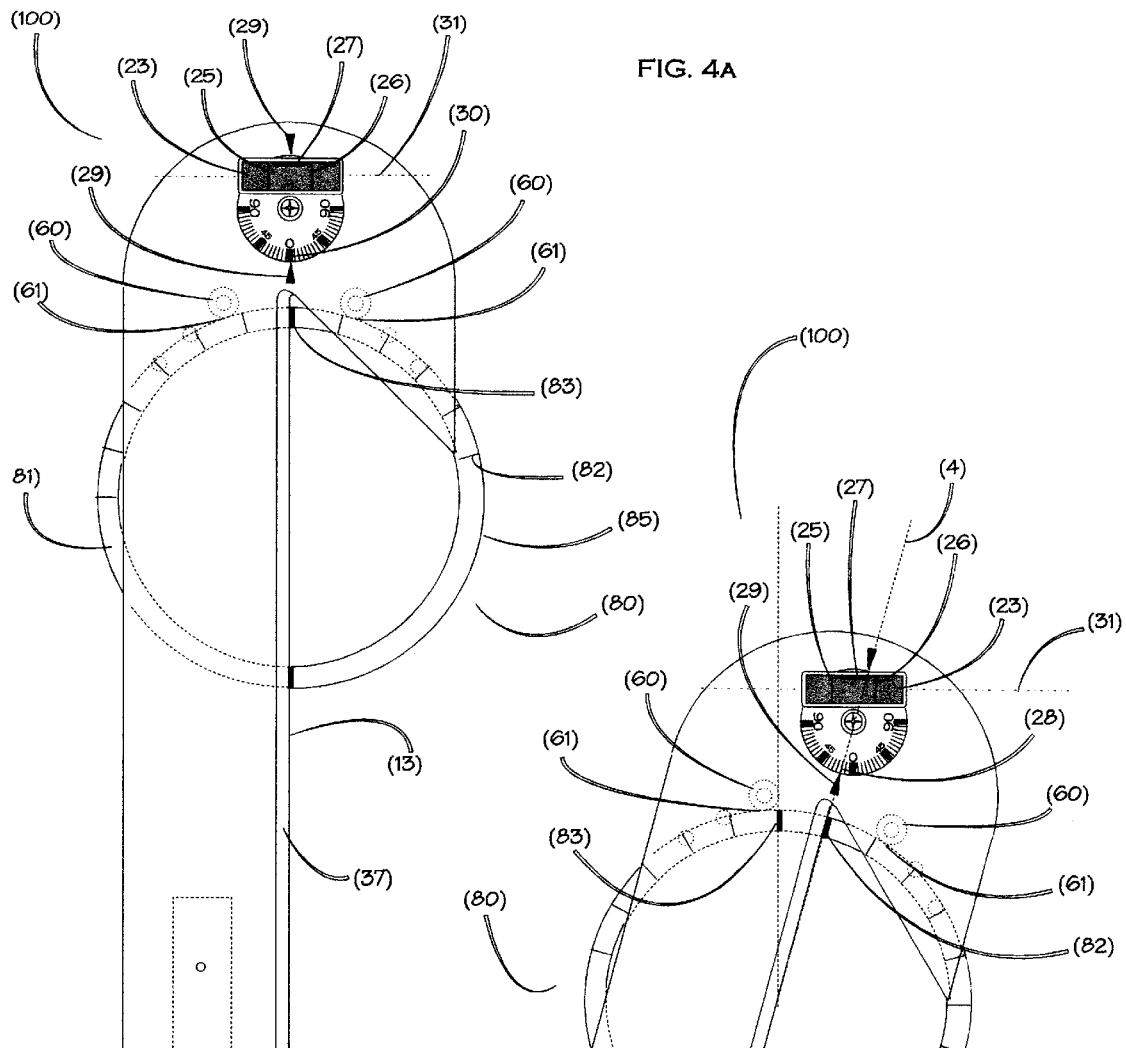
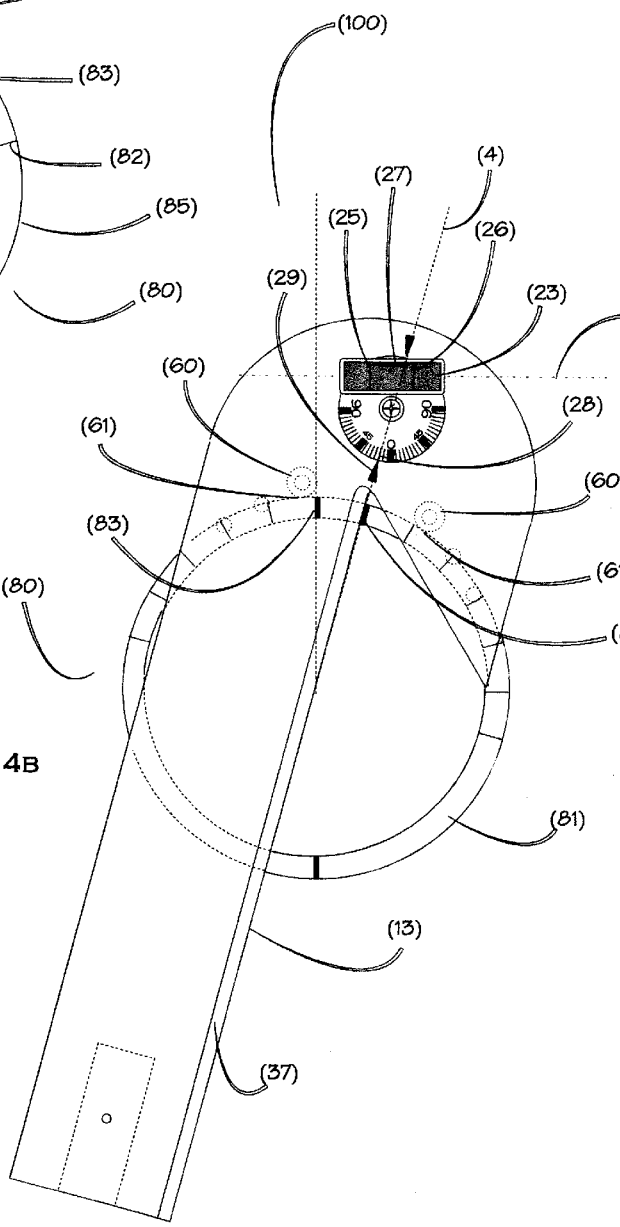
FIG. 4A
FIG. 4B

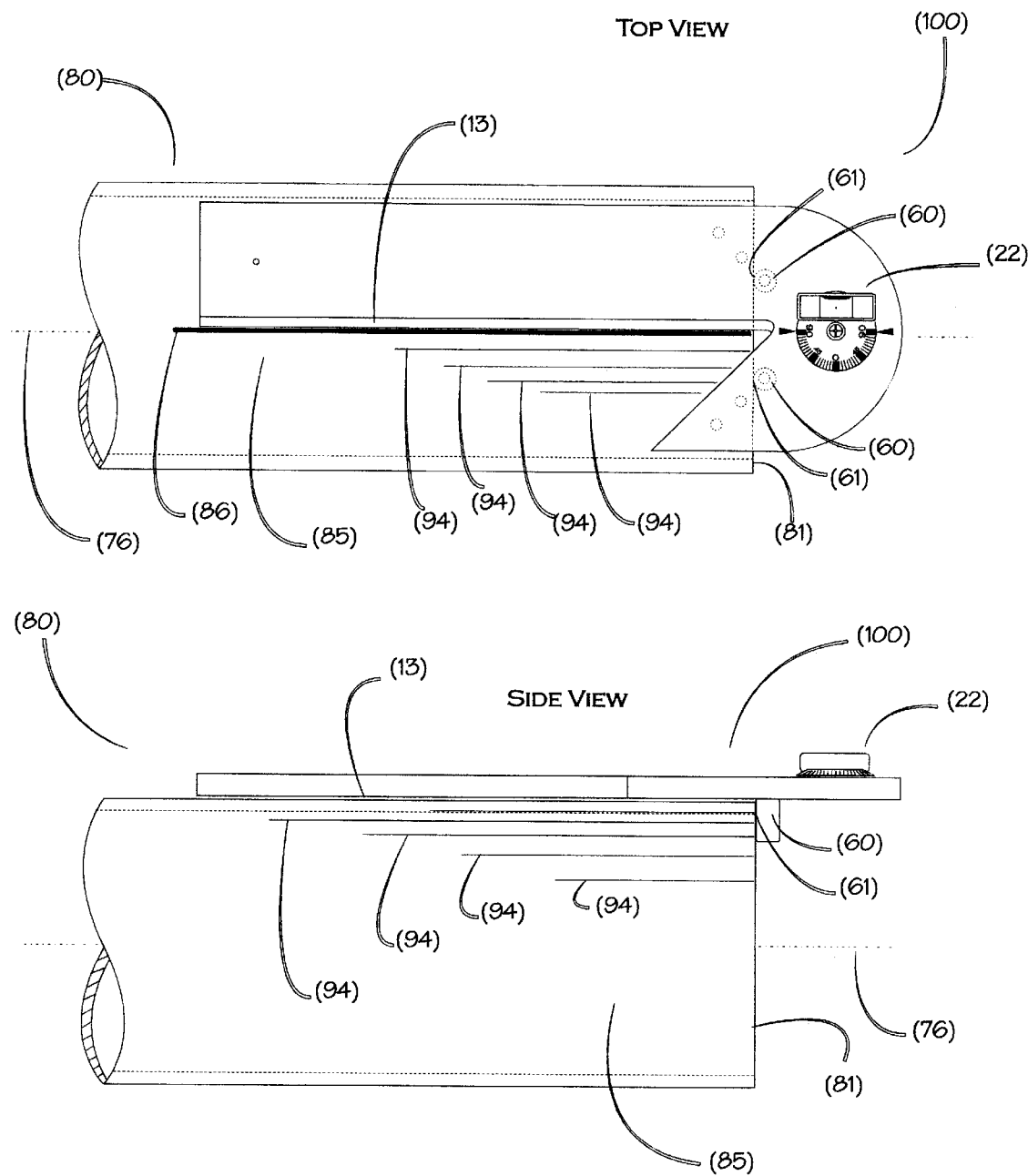

PIPE FITTERS LAY OUT TOOL

BACKGROUND OF THE INVENTION

The present invention relates to tools used In the fabrication of pipe and more particular to a simple tool used for generating geometry and layout lines required for precise cutting and joining of pipe sections in preparation for welding.

Oftentimes, due to pipe size, complexity of required joint intersect angles and final configuration of a piping system or run as it is commonly referred to, it is impractical to join the various sections of pipe by means of threaded ends requiring joints and pipe sections to be mated by annular weld beads.

To insure proper fit and joint integrity of pipe sections that intersect at various angles forming a particular joint for welding, each of the pipe sections or components are required to be cut at a specific geometry that will provide for proper fit of one to the another. The specific geometry of the cut required on either of the pipe sections is dependent upon the size and or respective size differences of each pipe component and angle of intersection required between each of the pipe components.

Due to overall size and weight of pipe sections to be joined, it is sometimes difficult if not impossible to perform layout and joining operations in a shop or location other than on sight or in the final position where the pipe sections will finally rest. Also, it is common for a configuration or run of pipe to become quite complex due to changes in direction of run or the number of intersecting joints required prior to completion.

To insure accurate welded mating of pipe sections to proper angles and predetermined specifications that comprise a particular run of pipe. It is always necessary to cut a particular geometry into the end and or circumference of pipe sections that are to be joined. The layout process including the location of the required joint, actual angle of intersection of the pipe components and the specific geometry that is to be cut on each of the pipe components is often very time consuming, especially when the work has to be performed on sight It is commonly the case for on sight fabrication of pipe sections for a pipe fitter to work in relatively restricted confines or areas that are difficult to access requiring the pipe fitter to limit the size as well as the number of tools he can bring to the work area. As there is usually a plurality of pipe sections joined together at various angles of intersection in any given run of pipe, accuracy at each step of lay out is of extreme importance as the accuracy of the overall project will be directly effected by the precision and accuracy employed in each of the preceding steps of the layout, cutting and welding process completed on each of the individual pipe joints comprising the run It is therefore, most important that all tools required by the pipe fitter in on sight layout for preparation of pipe sections, be rugged, compact, light weight, and easy to use while still allowing the work to be completed accurately and in a timely manner.

Although there have been a number of methods employed in performing the required lay out procedures as described above, two of the oldest and most common still used for on sight lay out of cut geometry by those familiar with the art of pipe fitting are the use of templates and or, pipe fitters ordinate tables which list cut points or ordinates as outlined in various pipe fitters hand books. Templates are patterns that define cut geometry. In the past, templates have been constructed on a drafting board and are fitted around the diameter of a pipe defining an outline of the geometry required for a given cut. Templates are now however commonly offered in pre-cut form that include templates with cut geometry for all standard pipe sizes as well as most common angles. The advantages of templates is that they are readily available, compact, accurate and lend themselves to on sight use.

The above referenced pipe fitters tables which outline ordinates or points required to identify a particular geometry for layout on pipe sections, are supplied in the various pipe fitters hand books carried by most all pipe fitters as an on sight reference. Pipe fitters handbooks are compact and considered an essential tool and reference guide as they include considerable related useful data as well as the ordinate tables outlining specific points as required to generate cut geometry needed for accurate lay out of pipe sections. It is important to note that although ordinate tables or templates as outlined provide data needed for laying out a particular geometry or shape as a guide for cutting a pipe section, the actual lay out procedure however requires additional tools for establishing angular orientation, and guidelines necessary to insure proper placement of the templates or ordinate points onto the pipe sections.

PRIOR ART

There have been a number of pipe fitters lay out tools developed that deal with generating the geometry required for joining pipe sections at various angles. Although some have been relatively innovative, the tools generally fall into two categories which are, combination squaring instruments used in conjunction with templates or pipe fitters ordinate tables and, the larger and more sophisticated mechanisms designed primarily for in shop use.

The more compact combination squaring instruments in use today which lend themselves better to on sight use, comprise various types of pipe fitters squares or combination instruments and are typified by Claude D. Moran's U.S. Pat. No. 4,380,872 "Pipe fitters combination instrument" issued Apr. 26th, 1983. Although Mr. Morans square is useful for squaring pipe ends or flanges. It lacks in the ability to indicate required angles other Than horizontal, vertical or 45 degrees on a pipe face easily. The tool also makes no provision for self centering across a pipe face diameter when generating angular lay out lines or transcribing lay out lines from pipe face to pipe circumference without readjustment of the tool. Although combination type lay out tools may be more versatile allowing squaring of pipe flanges or other capabilities, they are more complex to use as they require adjustments to squaring arms and or additional layout tools to complete basic lay out process as required for generating cut geometry guide lines on pipe sections.

In the category of the more sophisticated lay out tools, the "Ellipsoid Marker and Template Tracer" U.S. Pat. No. 3835541 by Whitworth, Sep. 17th, 1974 is a typical example. This tool is one of several more complex approaches to laying out cut line geometry Systems of this type are not very compact however as they usually consist of a precision protractor equipped rotational point which attaches the tool to it's base, and a long articulated arm equipped with a marker that can access the entire circumference of a pipe section.

Although tools of this type; when set up properly and properly attached as required to the pipe or work piece being laid out have the ability to accurately indicate cut geometry, the proper angle and the location of the necessary cuts without templates or ordinate tables, they are not light weight or rugged, requiring that they generally be used in large shop environments or areas that do not restrict movement of the tool, the articulated arm or it's component parts

SUMMARY OF THE INVENTION

The layout tool of the present invention overcomes the limitations of the tools outlined above in that it is an accurate and simple squaring tool. It is rugged in that there are no delicate components, light weight in that it can be manipulated with one hand, compact, allowing for use in confined spaces and easily portable as it can be carried in a large pocket or small tool bag. The tool is designed to be used in conjunction with common readily available pre made templates or pipe fitters ordinate tables and accurately provides for the primary steps necessary for laying out pipe sections for joining including angular dissecting of the end of pipe or any round object on a vertical plane, transcribing of the angled lines to the pipe circumference and providing for linear measurements as required for lay out of cut geometry on pipe sections Solid one piece construction of the tool frame make it inexpensive to manufacture and extremely rugged. The lay out tool of this invention has only one moving part which is the small proactor level arrangement inlaid in the frame of the tool for orienting the straight edge to an infinite number of angles on the face of a pipe. A set of squaring pins are provided which locate on the circumference of pipe and provide for self centering of the straight edge across the diameter of a pipe face when laying out angles. The squaring pins are long enough to engage the face of a pipe section when the tool is positioned on the circumference of a pipe with the straight edge parallel to the longitudinal center line of the pipe providing for easy transcribing of the angular face lines to the circumference of pipe section. Squaring pins allow for fast and simple orientation of the tool during the layout process and provide for proper positioning of templates on pipe circumference and laying out of cut points as specified by ordinate tables required for generating the geometry needed to accurately cut and fit pipe components together at various angles of intersection.

It is an object of this invention to provide a simple rugged and compact layout tool that is used in conjunction with pre-made templates and or pipe fitters layout tables, will accommodate a wide range of pipe diameters, can be manipulated in confined spaces and is capable of self centering a straight edge across a diameter of pipe or any circular member oriented in a vertical plane. It is also an objective of the present invention to provide for a means of identifying an infinite number of angles on a circular member orientated on a vertical plane. It is also an object of this invention to provide a tool equipped with a self aligning member which provides for linear measurement as well as a guide for the scribing of lines on a pipe circumference substantially parallel to the pipe longitudinal centerline.

The layout tool in according to this invention will be more clearly defined by the detailed description of the preferred embodiment and the drawings which follow where

BRIEF DESCRIPTION OF THE DRAWINGS

FIGS. 2a and 2b show blow-up assembly view of tool and extension

FIGS. 4a and 4b show tool layout procedure

FIG. 5 shows top and side view of tool transposing lines to pipe circumference

DETAIL DESCRIPTION

Figure 1A:
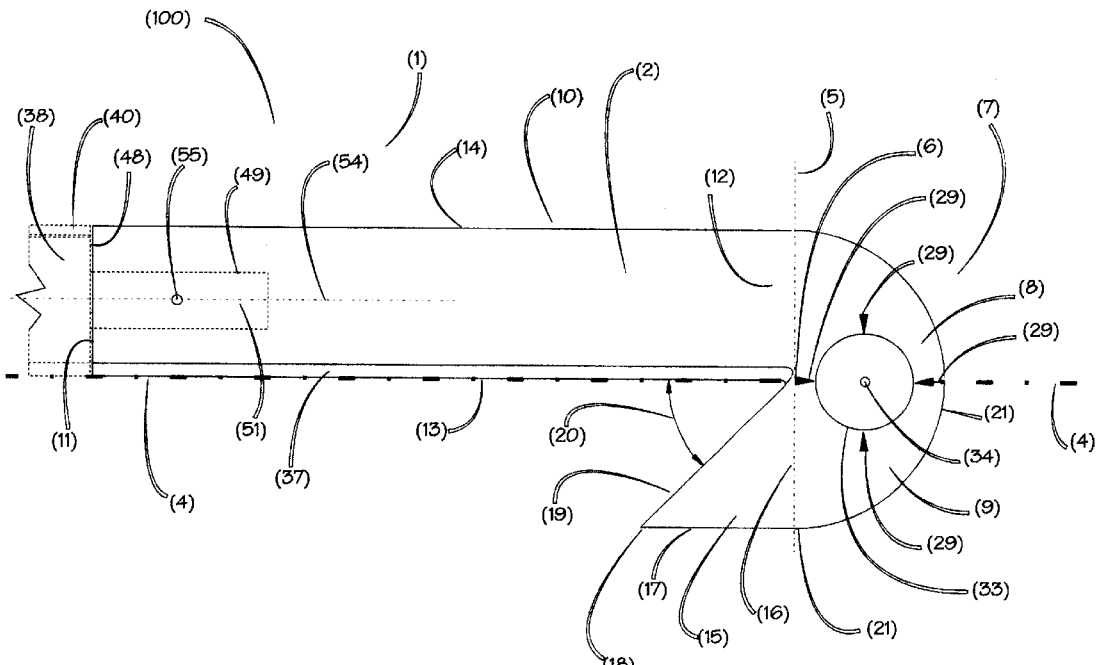
FIGS. 1a and 1b show frame profile and frame top and bottom surface details

Referring to FIGS. 1a and b where 1a shows the top surface and 1b shows the bottom surface of the preferred embodiment of Pipe fitters layout tool, here in referred to as the tool 100. Tool 100 is comprised of a one piece frame 1 fabricated from lightweight material such as aluminum approximately ⅜" thick.

Said one piece frame 1 being of irregular geometry can best be described by identifying three basic geometric shapes that comprise the shape of frame 1. The shapes are, a half circle consisting of two quadrants, an elongated rectangle and an Isosceles triangle. It should be noted for the purpose of this description that three shapes are used to define the single overall shape of frame 1. The shapes are directly adjacent to each other and relative to two lines that are perpendicular to each other. The two lines are, the longitudinal centerline 4 of frame 1 and datum line 5 which crosses substantially perpendicular to longitudinal centerline 4 at point 6. The first basic shape will best be described as a half circle of approximately 2⅝ inch radius here in referred to as radius end 7 of frame 1. The half circle shape of radius end 7 is generated from point 6 located at the intersection of datum line 5 and longitudinal center line 4 of frame 1. Datum line 5 also defines the major diameter of the half circle shape of radius 7 For further descriptive clarification, radius end 7 is further divided into quadrants 8 and 9 by longitudinal center line 4 of frame 1. A second basic shape used in the description of frame 1 is a rectangle with a width or minor dimension of approximately 2¾" and 14" long measuring from end 11 to end 12 which is directly adjacent to datum line 5. This rectangle will here in be referred to as blade 10. Blade 10 comprises one physical end 11, one end adjacent to and defined by datum line 5 here in referred to as opposite end 12, a straight edge 13 and a back edge 14. Straight edge 13 and back edge 14 are parallel to each other. Straight edge 13 lies substantially on a portion of longitudinal center line 4 of frame 1. End 12 of blade 10 is adjacent to the portion of datum line 5 which serves as on side of quadrant 8. A third basic shape that helps to clarify the overall geometry of frame 1 is an Isosceles triangle here in referred to as tang 15. The Isosceles triangle defining tang 15 is oriented with one of the equal sides 16 directly adjacent to datum line 5 which along with longitudinal center line 4 define the two straight sides of quadrant (9). Side 17, being the other equal side of the Isosceles triangle that forms tang 15 extends from a point tangent to radius edge 21 where radius edge 21 in quadrant 9 of radius end 7 intersects with datum line 5 and terminates at tip 18 on tang 15. The third side of the Isosceles triangle that defines tang 15 is inside edge 19 which extends from tang tip 18 back to point 6 on center line 4 of frame 1 forming angle 20 which is approximately 45 degrees. Referencing radius end 7. Pocket 33 comprising a 1¾ inch circle, approximately ⅛ inch deep countersunk into top surface 2 of radius end 7 in frame 1 is provided to receive protractor bubble level 22 as shown in FIG. 2 Pocket 33 to be centered on longitudinal centerline 4 at a point of equal distance between point 6 of radius end 7 and where frame centerline 4 meets radius edge 21 of radius end 7. Threaded protractor mounting hole 34 to be substantially centered in pocket 33.

Figure 3A:
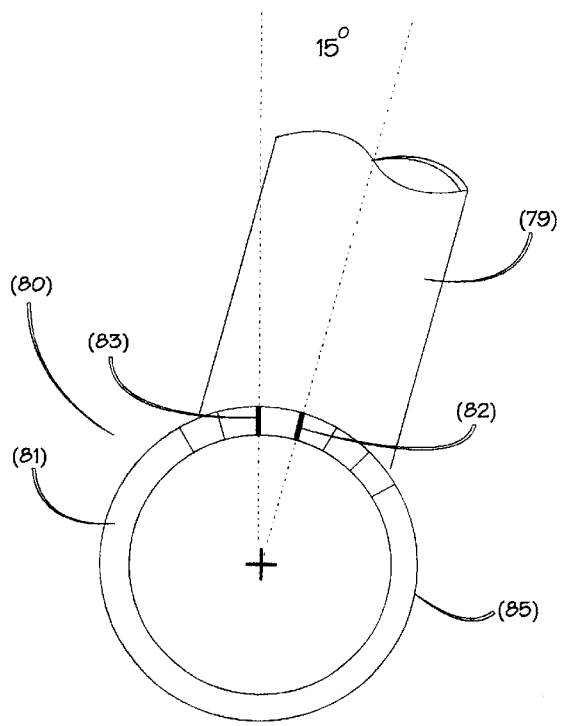
FIGS. 3a and 3b show common pipe joining details

Referring now to FIGS. 2, 4a and 4b which in combination shows protractor mounting hole 34 in pocket 33 to be threaded to mate with retaining screw 35 securing Protractor bubble level 22 in pocket 33. Protractor bubble level 22 provides for rotational orientation of tool 100 when used in a vertical plane for angular marking of pipe face 81 as shown in FIG. 3. Protractor bubble level 22 comprises a degree plate 24 and a liquid bubble assembly 23 substantially fixed to degree plate 24. Bubble assembly 23 is provided with centering lines 25 and 26 which indicate when Bubble 27 is centered in bubble assembly 23. Degree plate 24 provides indicia 28 for indicating angularity between protractor bubble level 22 and reference marks 29 locked directly adjacent to pocket 33 substantially on longitudinal center line 4 of radius end 7 on frame 1. Indicia 28 comprises degree marks with zero degrees indicia line 30 being perpendicular to level tube center line 31. Indicia 28 to be oriented around degree plate 24 and provide for one degree increments in either direction from zero degrees 30 to 90 degrees. It should be noted that although the indicia in this illustration is carried on degree plate 24 it could instead be located on top surface 2 of frame 1 around the parameter of pocket 33 and reference marks 29 placed on degree plate 24.

Protractor bubble retaining screw 35 secures protractor bubble level 22 in pocket 33 of frame 1 by passing through spring washer 36 continuing through center hole 32 in degree plate 24 and mates by threaded attachment to protractor mounting hole 34 in center of pocket 33. Protractor bubble level 22 is also provided frictional adjustability by retaining screw 35 compressing spring washer 36 against degree plate 24 which in turn presses protractor bubble level 22 into pocket 33 providing the frictional restraint necessary for holding protractor bubble level 22 in a rotationally adjusted position.

Now referring back to FIGS. 1a and 1b for continued details of blade 10 on frame 1 where in chamfered recess 37 of approximately 45 degrees is provided on straight edge 13 of blade 10 on frame 1 for additional clearance to aid in marking or scribing accuracy by the pipe fitter. Straight edge 13 to lie substantially on longitudinal center line 4 of frame 1 of blade 10 and 45 degree chamfered recess 37 to extend over complete length of straight edge 13.

Figure 6A:
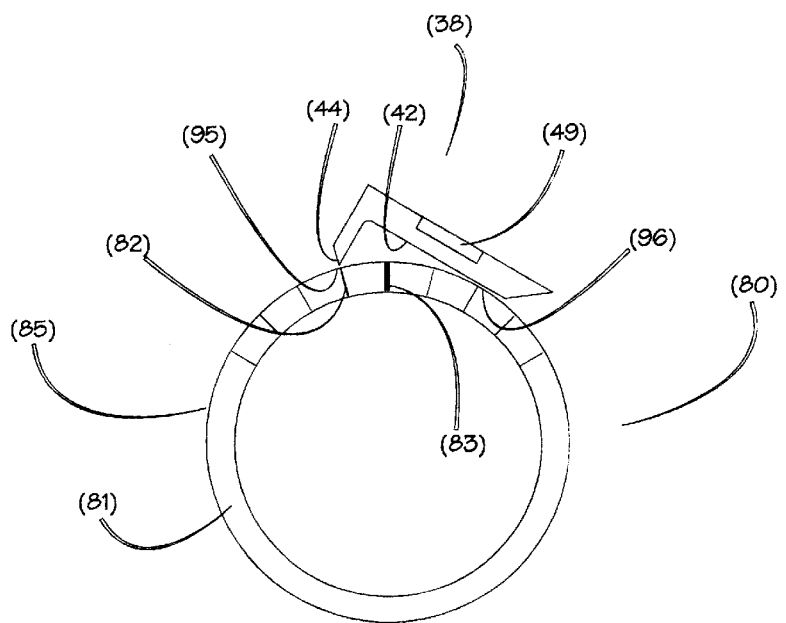
FIGS. 6a and 6b show tool extension layout procedure
Figure 6B:
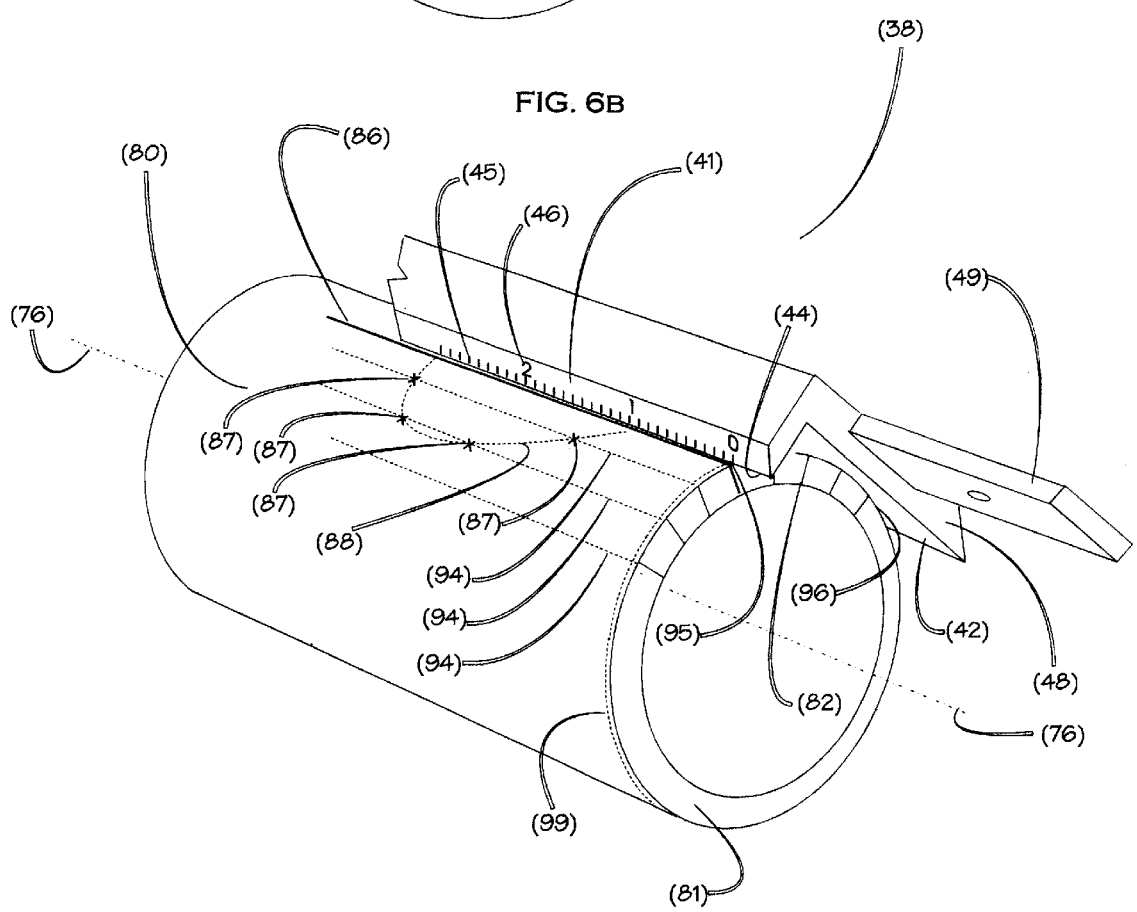

Referring now to FIGS. 2a and 2b Where in extension 38 is provided for the purpose of extending blade 10 providing the ability of frame 1 to accommodate larger pipe diameters, provide for misc. linear measurement as might be required by the pipe fitter and provide a secondary means for transposing layout lines on pipe sections as shown in FIG. 6b. Extension 38 to be fabricated of the same material as Frame 1 or machined from an angle shaped extrusion. Extension 38 comprises a cross section where base 39 is approximately the same geometry as blade 10 including blade recess 37 with the exception of extension 38 being provided with a back fence 40. Back fence 40 extends perpendicular approximately 1¼ inches from top surface 42 of base 39 providing for utilizing extension 38 independent of frame 1 as a self aligning straight edge for scribing or marking longitudinal lines on the circumference of pipe requiring parallelism to the axis or center line of the pipe. Top edge 44 of back fence 40 to be chamfered at approximately 45 degrees providing relief surface 43 to accommodate numbered scale 41. Numbered scale 41 comprises a plurality of spaced markings 45. Markings 45 are spaced longitudinally on relief 43 directly adjacent to top edge 44 and designate linear measurement in the increments of ¹⁄₁₆ inch for each mark. Markings 45 of a different length are provided to indicate quarter inch, half inch and one inch as typically found on rulers and other measuring instruments. It should be noted that in actual use as a self aligning straight edge, extension 38 will be inverted from it's illustrated orientation in FIG. 2b and will be positioned on a pipe section as outlined in FIGS. 6a and 6b. For this reason, numerals 46 indicated on the number scale 41 of relief 43 will be oriented with the top of each numeral 46 adjacent to back face 47 of back fence 40 thus allowing for proper orientation of the numerals for easy identification by the pipe fitter. When extension 38 is used as a self aligning scale of measurement. Numerals 46 as described starting with numeral 0, to commence from the face end 48 on relief 43 of extension 38, and continue on toward the opposite end of extension 38 as far as the length of extension 38 allows. Extension 38 is provided for with a tongue 49 for mating extension 38 with blade 10. Tongue 49 to be approximately 1 inch wide and ³⁄₁₆ inch in thickness and extend approximately three inches out from extension face 48. Tongue 49 bottom side 53 to be substantially on the same plane as bottom side 52 of extension 38.

Figure 1B:
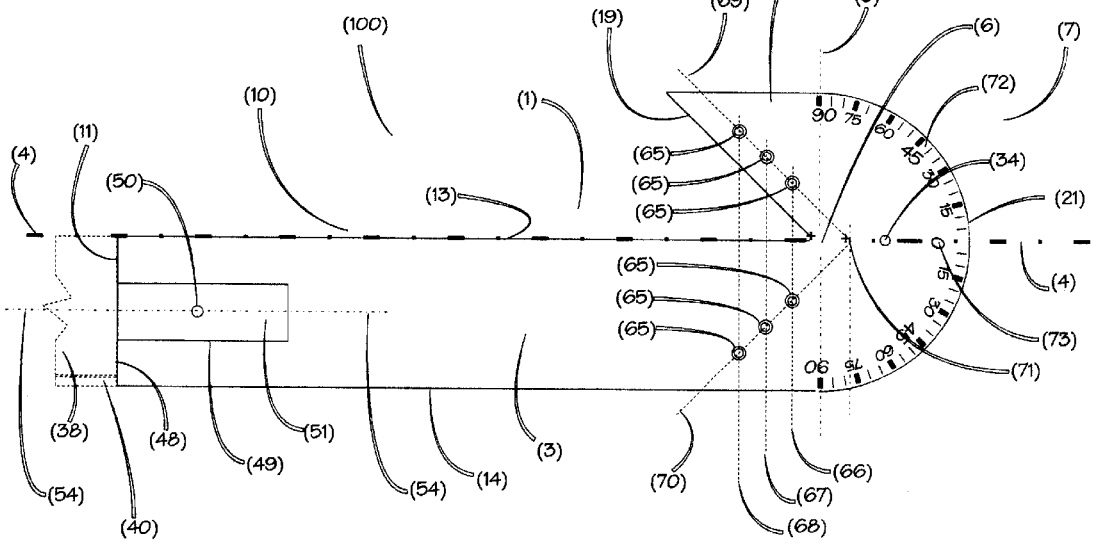

Referring now to FIG. 1b where in tongue 49 is machined or otherwise formed on face 48 end of extension 38 and positioned to insure proper and straight alignment of extension 38 to centerline 54 of blade 10 when tongue 49 is mated into receiving slot 51 of blade 10 and when extension face 48 is directly adjacent to, and seated against end 11 of blade 10 of frame 1. Tongue 49 provided for with a centrally located threaded hole 50 or other means to secure tongue 49 in place when mated to receiving slot 51 of blade 10.

Referring now to FIG. 2 which further illustrates the means by which extension 38 is mated to blade 10 on frame 1 where by extension tongue 49 seats into receiving slot 51 in end 11 of blade 10 and is secured in place with attachment screw 56 which passes through extension attachment screw hole 55 located on blade 10 for threaded attachment to threaded tongue hole 50 on tongue 49 substantially seating extension face 48 of extension 38 adjacent to end 11 of blade 10 in frame 1.

Referring now to FIG. 2b where in two identical movable locating pins 60 protrude from bottom surface 3 of frame 1 providing for automatic self centering of straight edge 13 substantially across the diameter of pipe face 81 of a pipe section 80 and orienting straight edge 13 parallel to centerline 76 on circumference 85 of pipe section 80. Locating pins 60 to be approximately ½" inch diameter at surface 61. Surface 61 to be approximately 1" long and provided for with a screw slot 62 at one end for installation and removal of locating pin 60 from bottom surface 3 of frame 1. Locating pin 60 to be provided with a shoulder 63 which seats against bottom surface 3 of frame 1 when locating pin 60 is substantially mated by threaded attachment to threaded pin hole 65 as shown in FIG. 1b. Threaded end 64 of locating pin 60 to be approximately ¼ inch in length and is provided for threaded attachment of locating pin 60 to any of the plurality of threaded pin holes 65 in bottom surface 3 of frame 1, as shown in FIG. 1b.

Referring now to FIG. 1b. Three sets, for a total of six threaded pin holes 65 are provided for in bottom surface 3 of frame 1 to accommodate various pipe diameters. Threaded pin hole 65 locations are determined by points where lines 66, 67 and 68 which are substantially perpendicular to centerline 4 of frame 1, continue on to intersect angle lines 69 and 70 of frame 1. Angle lines 69 and 70 are substantially 45 degrees from longitudinal center line 4 of frame 1 forming a combined angle of 90 degrees where they converge at point 71 on bottom surface 3 of frame 1. Convergence point 71 to be located approximately ¾" from point 6 and between point 6 and threaded protractor mounting hole 34 in pocket 33 on center line 4 of frame 1. It should be noted that two threaded pin holes 65 on each of the threaded pin hole lines 66, 67 or 68 comprise a single set of threaded pin holes 65 and that both locating pins 60 must be in threaded pin holes 65 that define a particular set for straight edge 13 to properly orient itself across the center of a pipe face 81 of pipe section 80 as shown on FIG. 4a.

Referring again to FIG. 1b for detailed layout of threaded pin holes 65 where one set of threaded pin holes 65 are positioned on each of the lines 66, 67 and 68 and where lines 66, 67 and 68 are substantially parallel to datum line 5 and perpendicular to longitudinal center line 4 and where each set of threaded pin holes comprise a single threaded hole 65 positioned on either side of longitudinal center line 4 equal distance from longitudinal center line 4 and where the distance between datum line 5 and threaded pin hole 65 line 66 is approximately ¼". The distance between line 66 and line 67 is approximately ⅝" and the distance between line 67 and line 68 is approximately ⅝". It should be noted that the selection of threaded hole sets located on lines 66, 67 or 68 for locating pins 60 is determined by the pipe fitter and will depend upon the diameter of the pipe that the pipe fitter will be working on.

Figure 3B:
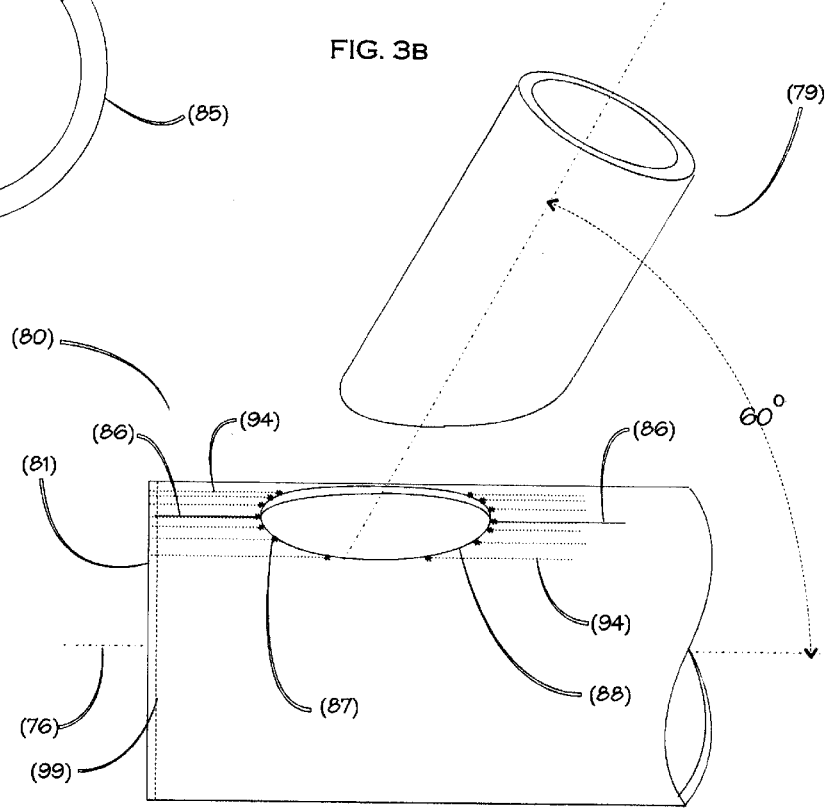

Referring now to FIG. 1b. An optional general purpose angle guide 72 is provided on bottom surface 3 of frame 1 For the purpose of rough estimating general angles of pipe intersections by the pipe fitter. Angle guide 72 comprises indicia in approximately 2½ degree increments arranged on bottom surface 3 around the parameter of radius end 7 adjacent to radius end 21 with numeral "0" 73 indicating zero degrees being substantially on longitudinal center line 4 on bottom surface 3 of frame 1 and numerals indicating each 15 degrees radiating in either direction from numeral "0" 73 to points located 90 degrees around the parameter of radius end 7 of bottom surface 3 on frame 1 with the numerals indicating 90 degrees being substantially on datum line 5. The general purpose angle guide 72 is outlined in the detail description of the preferred embodiment only as an example, as frame 1 top surface 2 or bottom surface 3 might easily be inscribed with any form of useful information which would be helpful to the pipe fitter. FIGS. 3 through 7 relate to the actual use of tool 100 for laying out angular dissection marks 82, transposing to extended layout lines 94 or primary layout line 86 as required for use with templates and identifying cut points 87 taken from ordinate tables outlined in the various pipe fitters hand books or guides. It is important to note that Reference line 99 as shown in FIGS. 3b and 6b, commonly known as wraparounds or wraparound lines by those familiar in the art of pipe fitting are marked on pipe section circumferences by the pipe fitter prior to any subsequent layout for use as a squaring or reference line Referring now to FIG. 3

Figure 7:
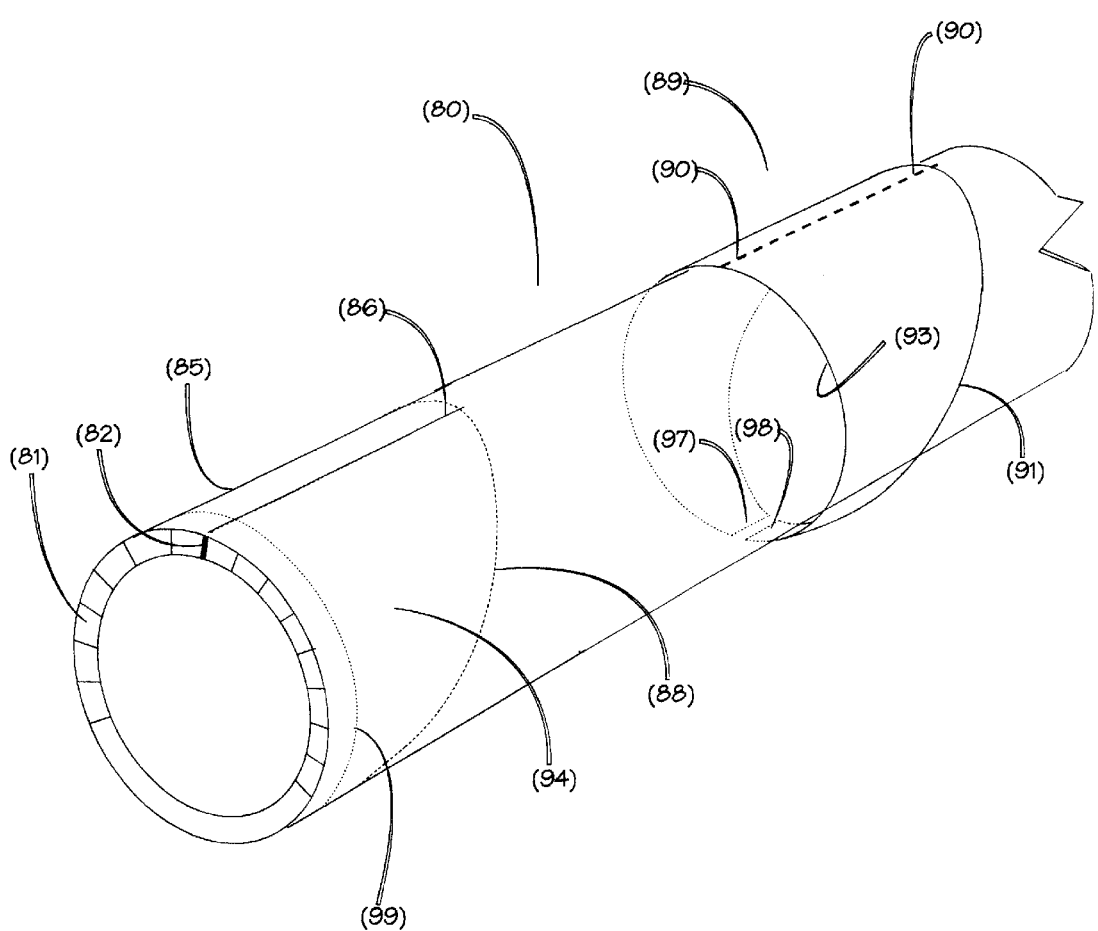
FIG. 7 shows common layout procedure for pipe fitters templates

An example of how tool 100 is used can best be shown by first outlining a common pipe joining objective where a smaller pipe section here in referred to as riser 79 is to be joined to pipe section 80 at a pre specified compound angle where by riser 79 is required to mate with circumference 85 of pipe section 80 at an angle of 15 degrees from vertical dissection mark 83 as indicated by angle dissection mark 82 and, at an angle of 60 degrees to axial centerline 76 of pipe section 80. The present invention can provide all cut geometry as required for both riser 79 or pipe section 80 using a template for laying out actual cut line 88 as shown in FIG. 7, or laying out cut points 87 as outlined in ordinate tables to generate cut line 88 as shown in FIG. 6b. Whether templates are used to generate final cut line 88 or ordinate tables from a hand book are used, the initial lay out procedure for establishing vertical, horizontal and angle lines on pipe face 81 with tool 100 will be the same.

Referring now to FIG. 4a where contact surfaces 61 of locating pins 60 of tool 100 are directly adjacent to circumference 85 of substantially vertical pipe face 81 of pipe section 80 for the purpose of establishing vertical dissection mark 83. Prior to placing tool 100 to pipe face 81 in the aforementioned position, protractor bubble assembly 23 to be rotated in pocket 33 of tool 100 aligning zero degree 30 directly adjacent to reference mark 29. Pipe fitter can use either of the two reference marks 29 depending upon the attitude in which he wants to use tool 100. Tool 100 is then positioned to pipe face 81 as outlined above and moved rotationally in either direction maintaining contact between contact surface 61 of locating pin 60 and circumference 85 of pipe section 80 until bubble 27 of bubble level 23 is centered equally between centering line 25 and centering line 26 of bubble level 23. With bubble 27 centered between centering lines 25 and 26 straight edge 13 of tool 100 will be substantially centered across the diameter of pipe face 81 vertically allowing for scribing of vertical dissection mark 83 on pipe face 81 of pipe section 80.

Referring now to FIG. 4b which shows tool 100 set up for scribing the 15 degree angular dissection mark 82 required to orient riser 79 to pipe section 80 as previously specified. Where protractor bubble assembly 22 of tool 100 has been rotated in pocket 33 aligning indicia 28 representing 15 degrees on degree plate 24 of protractor bubble level 22 directy adjacent to reference mark 29 and where contact surfaces 61 of locating pins 60 on tool 100 contact pipe section 80 at circumference 85 and where tool 100 has been rotated to a point where bubble 27 rests directly between centering line 25 and centering line 26 of bubble level 23 orienting straight edge 13 of tool 100 at a 15 degree angle to vertical dissection mark 83 of pipe face 81 providing for accurate scribing of angular dissection mark 82 as required for further layout of primary layout line 86 as shown in FIG. 6b and correct orientation of riser 79 to pipe section 80.

It should be noted that by rotating protractor bubble assembly 22 to any number of pre specified angles, any number of angular dissection marks 82 can be registered on face 81 of pipe section 80.

Referring now to FIG. 5 which shows a top and side view of tool 100 and the method by which tool 100 can be used to transpose extended lay out lines 94 or a primary layout line 86 from angular dissection marks 82. It will be noted that any extended lay out line 94 becomes a primary lay out line 86 when it is the line used to define the center line of the cut geometry to be scribed on pipe section 80. FIG. 5 shows tool 100 placed on pipe circumference 85 of pipe section 80 aligning bottom surface 3 of frame 1 of tool 100 directly adjacent to pipe circumference 85 with straight edge 13 of blade 10 being substantially parallel to axial center line 76 of pipe section 80 and where contact surface 61 of both locating pins 60 is in substantial physical contact with pipe face 81 automatically squaring straight edge 13 of blade 10 to pipe face 81 providing for transposing any of the plurality of angular dissection marks 82 previously marked on pipe face 81 as shown in FIGS. 4a and 4b thus providing for extended layout lines 94 or primary lay out line 86 to be scribed on pipe circumference 85 of pipe section 80 parallel to axial center line 76 of pipe section 80.

It should be noted that prior to transposing primary layout lines 86 or extended layout lines 94 from angular dissection marks 82 using this method, pipe face 81 must be substantially squared to pipe axial center line 76 of pipe section 80.

Now referring to FIGS. 6a and 6b where a second method of generating extended layout lines 94 or primary lay out line 86 by transposing angular dissection marks 82 from pipe face 81 to pipe circumference 85 is shown, where in extension 38 of tool 100 is used as a self aligning scribing and measuring device. Extension 38 becomes self aligning to pipe section 80 longitudinal axis as defined by axial center line 76 when extension 38 is placed on pipe circumference 85 longitudinally and approximately parallel to axial center line 76 of pipe section 80 and where by top edge a of extension 38 and top surface 42 of extension 38 are in substantial contact with circumference 85 of pipe section 80 as shown by contact points 95 and 96. When extension 38 of tool 100 is used in this manner, it is possible for the pipe fitter to transpose extended layout lines 94 or primary lay out line 86 from angular dissection marks 82 located on pipe face 81 even if pipe face 81 has an irregular surface or is slightly out of square to axial centerline 76 of pipe section 80.

Referring now to FIG. 6b where numbered scale 41 on extension 38 provides for linear measurement from either a previously squared pipe face 81 or wrap around line 99. This means for linear measurement of extended layout lines 94 is for the purpose of accurately identifying the pre specified location of template 89 on primary layout line 86 of pipe circumference 85 of pipe section 80 as shown in FIG. 7, or cut points 87 as outlined from pipe fitters ordinate tables. Any given extended layout line 94 may require one or two cut points 87 as shown in FIG. 6b depending upon the pre specified cut geometry required. Actual measurements for identifying any and all cut points 87 required, are outlined for the various pipe sizes and joining angles in pipe fitters Blue book ordinate tables. The actual number of angular dissection marks 82, extended layout lines (94) and cut points 87 required for any given layout will be dependent upon the number of cut points 87 needed to generate a smooth cut line 88.

Referring now to FIG. 7 showing a common detail where cut line 88 on pipe circumference 85 of pipe section 80 is identified by use of tool 100 and a template 89 where in angular dissection mark 82 has been scribed on Pipe face 81 of pipe section 80 in the manner described earlier and transposed to circumference 85 of pipe section 80 using tool 100 as previously described, generating primary layout line 86 on circumference 85 of pipe section 80 and where in template 89 having a predetermined geometry based upon pipe sizes and joint intersect angle requirements is indicated with primary lay out points 90 located on either end of template 89 and where template 89 is substantially wrapped over circumference 85 of pipe section 80 with template inside 93 of template 89 directly adjacent to pipe circumference 85. Template primary layout points 90 to be substantially aligned and adjacent to primary layout line 86 of pipe section 80 and template ends 97 and 98 to be directly adjacent to each other for the purpose of accurate radial alignment of template 89 to circumference 85 of pipe section 80. Cut line 88 is scribed on pipe circumference 85 of pipe section 80 by tracing along scribe line 91 of template 89 generating a cut line of pre specified geometry required for proper mating of the pipe sections.

The pipe fitters lay out tool in accordance with the present invention provides a means for more efficient pipe geometry lay out in that it is light weight, compact and rugged allowing for manipulation and reliable operation in restricted spaces or confined areas. It is simple to use having only one adjustment and accurately provides for the three initial and important steps related to lay out of pipe fitting geometry including. Indicating vertical and angular lines on the face of a pipe section, providing a means for transposing the lines to the circumference of a given pipe section and accurate placement of cut points onto the lay out lines.

The foregoing description of the preferred embodiment of the present invention has been presented for the purposes of illustration and description. It is not intended to be exhaustive or limit the invention to the precise form disclosed. Many modifications and variations are possible in light of the above teachings. It is intended that the scope of the invention be limited not by this detailed description, but rather by the claims appended hereto.

What is claimed is:

1. What is claimed is a device for use by a pipe fitter for positioning and generating cut geometry required for welded fabrication of pipe sections comprising a one piece frame having a half circular diameter with a center point located midway on the line that defines the major diameter of said half circle diameter, a top surface, a bottom surface and an elongated rectangular blade extending from said one piece frame at a right angle to the major diameter of said half circle shape with the minor dimension of said rectangular blade being equal to the radius of said half circle one piece frame, said rectangular blade portion having two parallel edges with a straight edge provided for by at least one said parallel edge defining the longitudinal center line of said device and terminating at said center point of said major diameter of said half circle shaped one piece frame two elongated locating pins comprising a set; threadedly attached to threaded locating pin holes provided in said bottom surface of said one piece frame in the approximate area where said rectangular blade extends from said half circle shaped one piece frame with one said elongated locating pin situated on either side of said center line of said one piece frame substantially perpendicular to said straight edge a rotationally adjustable protractor bubble level assembly mounted to top surface of said half circle shaped one piece fame with said protractor bubble level assembly being provided for with a degree plate and said degree plate being provided with indicia for angular reference of said straight edge.

2. The device as set forth in claim 1 where in said bottom surface of said one piece frame is provided for with a plurality of sets of threaded locating pin holes with varying distance between each of the said threaded locating pin holes that define a particular set.

3. What is claimed is a device for use by a pipe fitter for locating and laying out cut geometry required for welded joining of pipe sections including, marking angular dissection lines on the end of a pipe or any round surface oriented in a vertical plane, transposing lines and providing a means for linear measurement comprising a half circular one piece frame comprising a rectangular blade portion extending at right angles from a line defining the major diameter of said half circular one piece frame said blade portion comprising two parallel edges defining the width of said blade with said width of said blade being equal to the radius of said half circular frame, one of said edges defining a straight edge and the longitudinal center line of said one piece frame with one end of said straight edge of one piece frame being terminated at center point of said half circle with said center point of said half circle being located substantially midway on a line defining the major diameter of said half circular one piece frame and a means for removable attachment of an extension to said rectangular blade portion of said device and a means for squaring and self centering said straight edge of said one piece frame comprising a set of elongated locating pins where said elongated locating pins are threadedly attached into one particular set of a plurality of sets of threaded locating pin holes arranged where each particular said locating pin hole defining said particular set of locating pin holes is to be located one on either side of said center line and on a line perpendicular to said center line on bottom surface of said half circular one piece frame approximately at a point where one end of the rectangular geometry of said blade is adjacent to said half circular geometry of said one piece frame and a means for angular orientation of said straight edge being provided for by a rotationally adjustable protractor bubble level mounted to said front surface of said half circular one piece frame with said protractor bubble level being provided for with a degree plate and said degree plate being provided with indicia for angular reference of said device and an extension providing a means for extending said blade portion of said device comprising an elongated member with means for removable attachment to said blade portion of said device and a means for automatic longitudinal alignment of said extension on an outside diameter of pipe provided for by said extension being of angular cross section formed by two adjacent sides of said extension being joined at an angle and said extension provided for with indicia on at least one said angled side allowing said extension to provide for linear measurement.

* * * * *